(No Model.)
C. A. CLARK.
RUBBER BELTING.
No. 472,601. Patented Apr. 12, 1892.
*Fig: 1.*
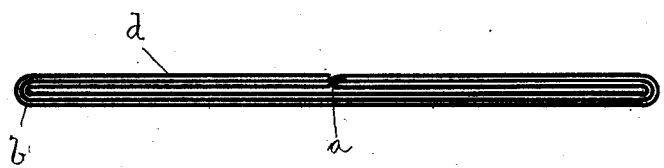
*Fig: 2.*
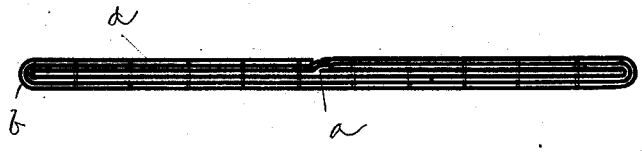
WITNESSES:
John J. Rathers
INVENTOR
Charles A. Clark
By Stanley Greacen
Attorney

UNITED STATES PATENT OFFICE.

CHARLES A. CLARK, OF BLOOMFIELD, NEW JERSEY, ASSIGNOR, BY MESNE ASSIGNMENTS, TO THE COMBINATION ROLL AND RUBBER COMPANY, OF SAME PLACE.

RUBBER BELTING.

SPECIFICATION forming part of Letters Patent No. 472,601, dated April 12, 1892.

Application filed March 15, 1886. Serial No. 195,471. (No model.)

*To all whom it may concern:*

Be it known that I, CHARLES A. CLARK, of Bloomfield, in the county of Essex and State of New Jersey, have invented a new and useful Improvement in Rubber Belting, of which the following is a specification.

My invention relates to an improvement in what is known as "rubber belting."

The object of the invention is to produce strong and durable belting in which the rubber is not liable to peel off or the edges to fray, as in the ordinary rubber belting at present manufactured.

In the drawings, Figure 1 represents one form of my improved belting made of rubber-coated duck or fabric folded or wrapped upon itself; and Fig. 2 represents my improved belting stitched, which may be done either before or after vulcanizing.

I will now proceed to describe a method by which my improved belting can be manufactured; but as there are various ways I do not confine myself to any particular one.

In the manufacture of my improved belting I take cotton or other suitable duck of any desirable weight or thickness, and after thoroughly drying the same give it what is known in the art as a "thin coat" of vulcanizable rubber compound, preferably on both sides. This can be done by a friction-calender or in any other desirable manner. Having the duck thus prepared by such friction-coat, I then form the belt by folding one edge of the duck in upon itself, as shown at $a$, Fig. 1, preferably to half the width required for the belt, although, if desired, the first fold can be made to any proportion of the width of the belt, and after rolling this turned-in portion of the duck firmly upon the surface under it, so as to attach the two surfaces together, it is again folded or wrapped upon itself the full width of the belt, as shown at $b$, until the required number of plies to form a belt of the desired thickness have been formed. The edge $c$ of the outside ply $d$ should terminate opposite to the edge of the inside or first ply $a$, so that the belt will be spiral in cross-section and of equal thickness throughout its width, as clearly shown in Fig. 1.

The object in making the belt of a single piece of material and wrapping it upon itself longitudinally, as above described, is that any strain upon it in use will be taken up and borne by each layer or thickness composing the belt equally, as when they are all sections of the same piece of material it is impossible to stretch one layer more than another in placing them together, and consequently any longitudinal strain upon the belt must be taken up and borne by each layer alike, whereas if separate strips be employed, as heretofore, it is impossible to give each piece the same tension that is given to the others in making up the belt, and consequently when the strain comes upon it the strip having the greatest tension is first broken and rendered useless, and then the other strips are broken in succession until the entire belt is broken.

Still another advantage over belts composed of separate strips of duck or other material having raw edges and which depend on a single outside ply to form the finished edges is that in my improved belt there is a finished edge for each ply composing the belt, so that after the outside ply becomes worn through the remaining plies will still be intact and help to hold the plies together, and as the edges of belting is almost the first part to become worn by usage this is quite an important feature in belting.

The belt can be stitched, if desired, either before or after it has been vulcanized, as shown at $g$ in Fig. 3.

I do not wish to claim, broadly, a rubber belt, as I am well aware that such have long been on the market, the difference between my belting and that now made being that my belt preferably has finished edges for each set of plies and is composed of plies of friction-duck without any rubber cover on the outside. The belt therefore has no surplus rubber to peel off while in use, and by reason of nothing but a friction-coat of rubber being used between the plies I am enabled to use a greater number of the same in a belt of a given thickness, the belt being, in fact, nearly all duck, and consequently much stronger than the ordinary belt, which has a layer of duck and a layer of rubber between each ply and consists of a nearly equal thickness of rubber and duck. By the use of the friction-coat, which should consist of rubber enough to stick the plies together, I am enabled to use a better quality of rubber without greatly affecting the cost of the belt or making it cost much more than the ordinary belting now in use and which has to be made of a poor quality of rubber to keep down the cost. Besides, I have found that my belting is less liable to stretch and that dispensing with the outside rubber cover does not make the belt hold less to the pulley when in use, and as there is no rubber to peel off the surface of the belt its durability is increased.

Having thus fully described my invention, what I claim as new, and desire to secure by Letters Patent, is—

A flat belt composed of a single piece of woven fabric, having a friction-coat of rubber and folded upon itself four or more times, with the edge of the outside ply opposite to the edge of the inside ply, whereby the folds are spiral in cross-section and the belt is of the same thickness throughout, and the whole vulcanized together, substantially as described.

In testimony that I claim the foregoing as my invention I have signed my name, in presence of two witnesses, this 4th day of March, 1886.

CHARLES A. CLARK.

Witnesses:
JOHN F. HALLINAN,
STANLEY GREACER.